United States Patent [19]
Siekmeyer et al.

[11] Patent Number: 5,452,545
[45] Date of Patent: Sep. 26, 1995

[54] IMPACT SUPPORT FOR A DOOR OF A MOTOR VEHICLE

[75] Inventors: Josef Siekmeyer, Ratingen; Ulrich Hoffmann, Duisburg, both of Germany

[73] Assignee: Mannesmann Aktiengesellschaft, Dusseldorf, Germany

[21] Appl. No.: 109,940

[22] Filed: Aug. 20, 1993

[30] Foreign Application Priority Data

Aug. 21, 1992 [DE] Germany ............... 9211327 U

[51] Int. Cl.⁶ ...................................... B60J 5/04
[52] U.S. Cl. .............................. 49/502; 296/146.6
[58] Field of Search .............. 49/502; 296/146.5, 296/146.6; 52/793, 720

[56] References Cited

U.S. PATENT DOCUMENTS

| | | | |
|---|---|---|---|
| 1,685,886 | 10/1928 | Speller | 52/720 X |
| 4,708,390 | 11/1987 | Palentyn et al. | |
| 4,866,883 | 9/1989 | Brown et al. | |
| 4,919,473 | 4/1990 | Laimighofer et al. | 296/146.6 X |
| 4,978,562 | 12/1990 | Wycech | 296/146.6 X |
| 5,232,261 | 8/1993 | Kuroda et al. | 296/146.6 X |

FOREIGN PATENT DOCUMENTS

| | | | |
|---|---|---|---|
| 425059 | 5/1991 | European Pat. Off. | 296/146.6 |
| 636080 | 3/1928 | France | 52/720 |
| 3728778 | 2/1989 | Germany. | |
| 4133144 | 4/1992 | Germany. | |

*Primary Examiner*—Peter M. Cuomo
*Assistant Examiner*—Jerry Redman
*Attorney, Agent, or Firm*—Cohen, Pontani, Lieberman, Pavane

[57] ABSTRACT

An impact support for reinforcing a door of a motor vehicle, including a hollow profile part that is fastenable in the vehicle door. The hollow profile part having, at least in a central region thereof, a portion with a roughly oval cross section having a cross-sectional height that is greater than a cross-sectional depth. The hollow profile part is arranged in the motor vehicle door so that the depth lies parallel to an impact direction. The roughly oval cross section is formed by two straight sides which lie parallel at a distance from one another and are connected at their ends by a convex portion that has a radius that is always greater than half the distance between the two straight sides.

7 Claims, 2 Drawing Sheets

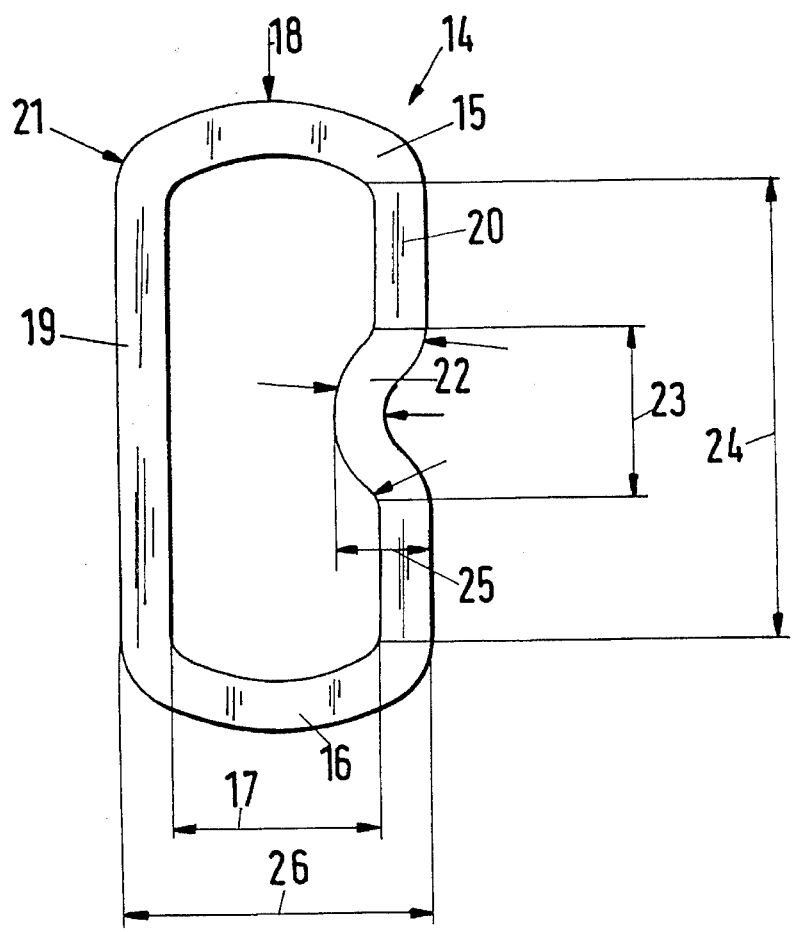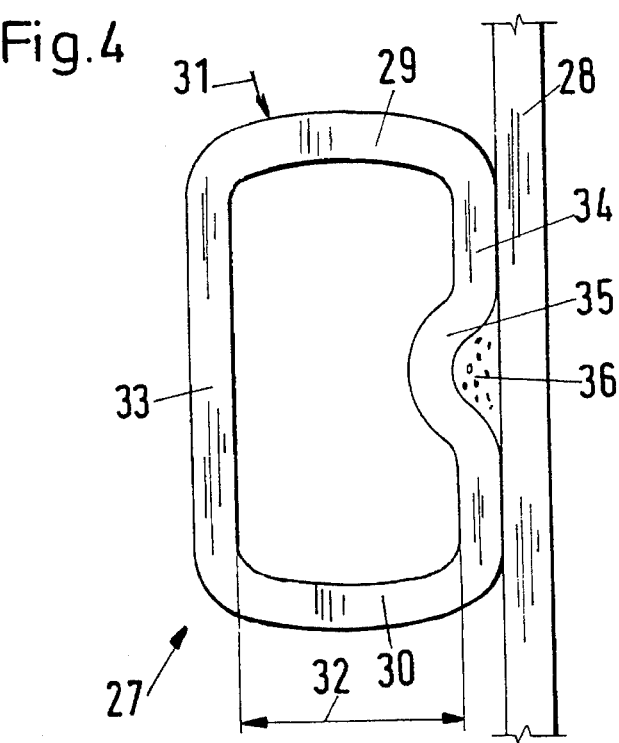

IMPACT SUPPORT FOR A DOOR OF A MOTOR VEHICLE

BACKGROUND OF THE INVENTION

1. Field of the Invention

The invention relates to an impact support for reinforcing a door of a motor vehicle, which support can be fastened in the door of the vehicle as a hollow profile.

2. Description of the Related Art

Impact supports serve to secure the passenger compartment of a passenger vehicle in that they reinforce the entire door construction and can accordingly absorb the work of deformation. Since the available installation space is limited, relatively thick-walled bending supports, particularly pipes, are used to achieve the required moment of inertia (U.S. Pat. No. 4,866,883; U.S. Pat. No. 4,708,390). When the installation spaces are very narrow, two bending supports instead of one are arranged one above the other. Alternatively, it is known to use profiles to economize on weight for thick-walled bending supports. These profiles have a center region whose cross-sectional height is always greater that the depth and are arranged in the motor vehicle door in such a way that the depth lies parallel to the direction of impact (DE-PS 37 28 778; DE-OS 41 33 144). These known profiles are not designed in an optimal manner with respect to their cross-sectional profile, weight or moment of inertia. Additionally, the box profiles have a relatively low buckling strength.

SUMMARY OF THE INVENTION

Accordingly, it is an object of the present invention to provide an improved impact support which is designed in an optimal manner with respect to its installation depth, weight, moment of inertia, and resistance to buckling. A further object resides in fastening the impact support to the motor vehicle door in a simple manner.

Pursuant to this object, and others which will become apparent hereafter, one aspect of the present invention resides in an impact support having a hollow profile and a roughly oval cross-section.

In contrast to the known box profile (DE 41 33 144, FIG. 1), the profile according to the invention has a roughly oval cross section. This cross section consists of two straight sides running parallel at a distance from one another which are connected at their ends by a convex portion having at least one radius. The radius of this portion is always greater than half the distance between the two straight sides. One advantage of this profile consists in that it has a small installation depth and can be fastened to the door of a motor vehicle in a simple manner due to the straight sides. Also, the buckling resistance is greater than that of a box profile. The moment of inertia of the profile according to the invention is greater in comparison to an elliptical profile (DE 41 33 144, FIG. 7) and a flat-oval profile (DE 41 33 144, FIG. 8), so that it is optimal in this respect.

Particularly advantageous ratios result when the radius of the convex portion is at least 1.5 times greater, preferably 10 times greater, than half the distance between the two straight sides. For technical reasons relating to manufacture, the transition from the convex portion to the straight side is rounded. The radius of this rounded portion is less than half the distance between the two sides and lies in the range of 1 to 5 mm.

The profile mentioned above is fastened in the door of a motor vehicle in a conventional manner by screws or by welding. For additional fastening of the profile to the motor vehicle door, it is further suggested that the straight side of the profile facing the vehicle door be provided with at least one bead. This bead serves as a glue reservoir when the profile is additionally glued directly to the inside of the exterior panelling or shell of the door of the motor vehicle. For this purpose, it is necessary that the axial dimension of the profile lying in the longitudinal direction be adapted to the usually slightly convex contour of the door of the motor vehicle. The additional fastening of the profile on the inside of the shell has the advantage that the shell is reinforced by the glued on profile in the desired manner. Formerly, it was conventional to glue thin plate sections to places on the inside of the shell for purposes of reinforcement. The proposed profile with a bead dispenses with this step. The proposed profile, with or without the bead, has the further advantage that the straight sides of the profile can also be used for fastening or receiving other door elements.

For a further reduction in weight, it is known (U.S. Pat. No. 4,708,390) to bevel the profile at the ends and to construct the end of the bevel in the manner of a tang or tab (DE 41 33 144). So that the fastening element, whether a screw, a nut, or a bolt, has sufficient material for attachment, the tab-like region can be reinforced by folding or upsetting. For this purpose, the end of the bevel is, for example, inductively heated and suitably formed on.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 3 shows another embodiment similar to FIG. 1, but with a bead; and

FIG. 4 shows the same view as FIG. 3 with the inclusion of the shell of a motor vehicle door.

DETAILED DESCRIPTION OF THE PREFERRED EMBODIMENTS

Figure 1:
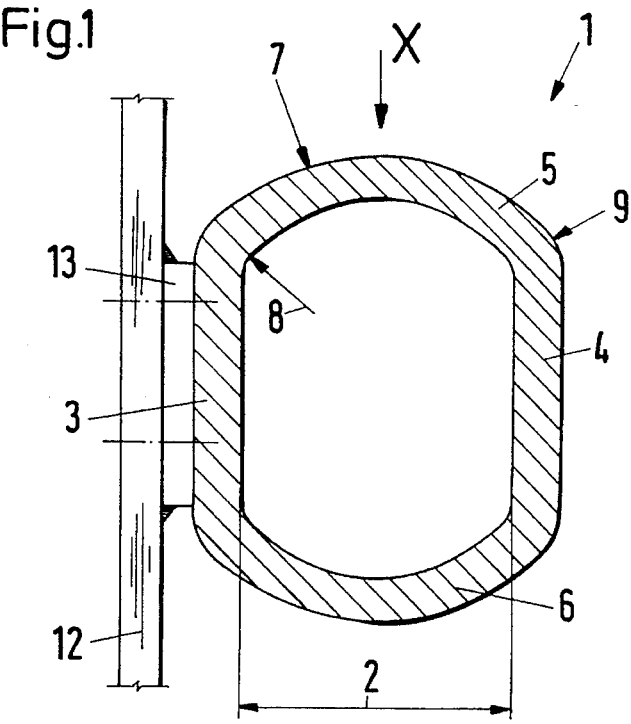
FIG. 1 shows a section of a profile, according to the invention, of an impact support along line A—A in FIG. 2.
Figure 2:
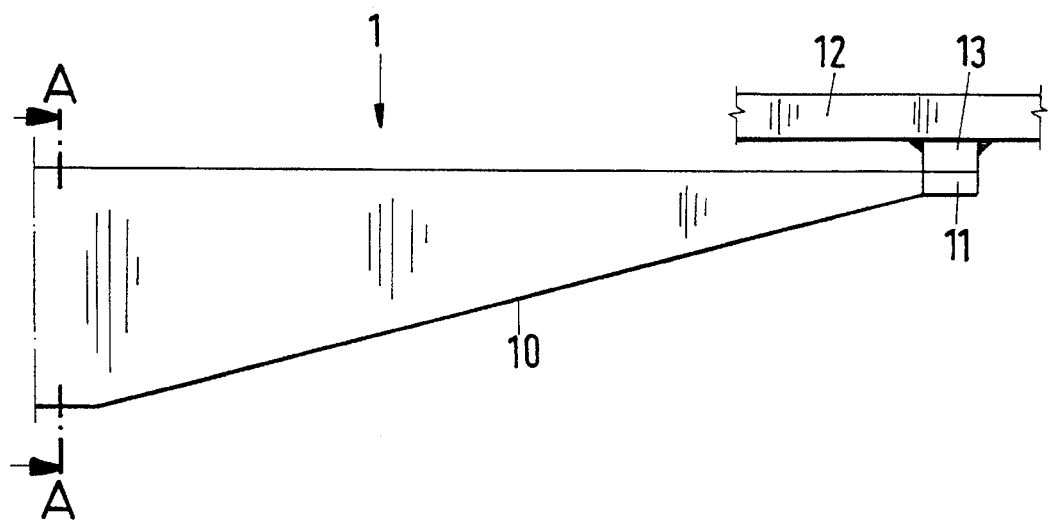
FIG. 2 shows a view in direction X in FIG. 1.

A first embodiment of the profile of an impact support 1, according to the invention, is shown in section in FIG. 1 and in a top view in FIG. 2. It has a roughly oval cross section with two parallel sides 3, 4 extending at a distance from one another. These straight sides 3, 4 are connected at their ends by a convexly curved portion 5, 6, whose radius 7 is always greater than half the distance 2 between the two sides 3, 4. In this specific example, the radius is approximately 1.7 times greater than half the distance 2. The convex portions 5, 6 merge into the two straight sides 3, 4 in a rounded manner, the radii 8, 9 of the rounded portion being less than half the distance 2 between the two sides 3, 4. These radii 8, 9 are between 1 and 5 min.

To economize on weight, the impact support 1 is beveled at the end, and the end of the bevel 10 is constructed as a tab 11. By way of example, a holding plate 13 provided with threaded bore holes is welded on for the purpose of fastening the impact support 1 to a door member 12. A screw can easily be inserted through a bore hole arranged in the tab 11 and the impact support 1 can be tightened to the door member 12. An alternative possibility is welding on a stud bolt which has a threaded portion and tightening the impact support 1 by means of a nut. A process for fastening the impact support 1 directly, e.g. by means of spot welding, is also possible and does not present a problem.

FIG. 3 shows a cross section of another embodiment of an impact support 14 according to the invention. This embodiment 14 differs from the embodiment shown in FIG. 1 in that the convex portion 15, 16 has a greater radius 18. In this example, the radius is approximately 2.3 times greater than half the distance 17 between the two straight sides 19, 20. The transition between the convex portion 15, 16 and the straight sides 19, 20 is likewise rounded 21. A peculiarity of this profile 14 is that it has a bead 22 on the straight side 20 facing the door of the motor vehicle. The significance of this bead 22 will be explained in more detail with reference to FIG. 4. In this example, only one bead 22 is formed on. But two beads 22 can also be formed at a distance from one another. The longitudinal dimension 23 of this bead 22 amounts to less than half of the longitudinal dimension 24 of the straight side 20 and the depth 25 is less than one quarter the depth 26 of the profile 14. The bead 22 also passes into the straight side 20 in a rounded manner. The different radii are designated by arrows.

FIG. 4 shows a profile 27 similar to that in FIG. 3, but in connection with the shell 28 of a motor vehicle door, not shown in detail. The convex portion 29, 30 in this embodiment is very flat in that the radius 31 of the convex portion 29, 30 is more than 10 times greater than half the distance 32 between the two straight sides 32, 34. Thus, the curvature of the convex portion 29,30 is barely perceptible over the short distance 32 and is shown in exaggerated fashion in FIG. 4 for clarity. In this example, the impact support 27 is additionally fastened to the inside of the shell 28 of a motor vehicle door by glue. The depression of the bead 35 together with the inside of the shell 28 forms a chamber 36 which serves as a reservoir for the applied adhesive. In this arrangement it is necessary that the axial dimension of the impact support 27 in the longitudinal direction conform to the contour of the shell 28 of the door of the motor vehicle. Since the shell 28 is usually slightly curved in a convex manner, the impact support 27 must likewise curve in a corresponding manner.

The invention is not limited by the embodiments described above which are presented as examples only but can be modified in various ways within the scope of protection defined by the appended patent claims.

We claim:

1. An impact support for reinforcing a door of a motor vehicle, comprising a hollow profile part that is fastenable in the door, the hollow profile part having, at least in a central region thereof, a portion with a roughly oval cross-section having a cross-sectional height that is greater than a cross-sectional depth, the hollow profile part being arranged in the door so that the depth lies parallel to an impact direction, the roughly oval cross section being formed by two straight sides which lie parallel at a distance from one another and are connected at their ends by a convex portion having at least one radius, the radius of the convex portion always being at least 1.5 times greater than half the distance between the two straight sides, the two straight sides and the convex portion being connected by rounded portions having radii that are less than half the distance between the two sides.

2. An impact support according to claim 1, wherein the radius of the convex portion is more than ten times greater than half the distance between the two straight sides.

3. An impact support according to claim 1, wherein one of the straight sides of the profile part is arranged to face the door, one of the straight side of the profile part facing the vehicle door having at least one bead which penetrates into one of the straight sides in a rounded manner.

4. An impact support according to claim 3, wherein one of the straight sides containing the bead has a longitudinal dimension, the bead having a cross-sectional longitudinal dimension that is less than half of the longitudinal dimension of one of the straight sides, and a cross-sectional depth that is less than one quarter the depth of the profile part.

5. An impact support according to claim 1, wherein the door has a contour, the impact support having an axial dimension lying in a longitudinal direction that is adapted to the contour of the door, the impact support being fastenable to an inside part of the door.

6. An impact support according to claim 5, wherein a chamber is formed between a depression of the bead and the inside part of the door so as to form a glue reservoir.

7. An impact support according to claim 1, wherein at least one end of the profile part is beveled and the bevel has an end that is constructed as a tab.

* * * * *